(12) United States Patent
Ichikawa et al.

(10) Patent No.: US 7,520,815 B2
(45) Date of Patent: Apr. 21, 2009

(54) CONSTANT VELOCITY UNIVERSAL JOINT

(75) Inventors: Kazuyuki Ichikawa, Okazaki (JP);
Isashi Kashiwagi, Kariya (JP);
Hiroyuki Iwashita, Tita-gun (JP);
Atsushi Ando, Kariya (JP); Junji Ando,
Kariya (JP); Yosei Ando, Toyohashi (JP);
Hiroyuki Ito, Nagoya (JP)

(73) Assignee: JTEKT Corporation, Osaka-shi (JP)

( * ) Notice: Subject to any disclaimer, the term of this patent is extended or adjusted under 35 U.S.C. 154(b) by 404 days.

(21) Appl. No.: 11/369,787

(22) Filed: Mar. 8, 2006

(65) Prior Publication Data
US 2006/0205522 A1 Sep. 14, 2006

(30) Foreign Application Priority Data
Mar. 9, 2005 (JP) .............................. 2005-065524

(51) Int. Cl.
*F16D 3/224* (2006.01)
(52) U.S. Cl. ..................... 464/145; 464/906; 148/906
(58) Field of Classification Search ................. 464/145, 464/146, 906; 384/492, 527, 576, 907.1; 148/319, 403, 561, 906
See application file for complete search history.

(56) References Cited
U.S. PATENT DOCUMENTS
4,673,375 A * 6/1987 Adolfsson ................... 464/145
6,619,847 B1 * 9/2003 Ishikawa et al. ......... 384/907.1
2006/0205522 A1 9/2006 Ichikawa et al.

FOREIGN PATENT DOCUMENTS
JP 2000-46061 2/2002

OTHER PUBLICATIONS

Universal Joint and Driveshaft Manual, AE-7, Warrendale, PA, Society of Automotive Engineers, Inc., pp. 149 & 150, TJ1079.S62 1979.*
Machinery's Handbook, 25th ed., New York, International Press, pp. 188-191, 526, 527, 708 & 709, TJ151.M3 1996.*
U.S. Appl. No. 11/617,237, filed Dec. 28, 2006, Ando et al.
U.S. Appl. No. 11/670,825, filed Feb. 2, 2007, Ichikawa.

* cited by examiner

*Primary Examiner*—Greg Binda
(74) *Attorney, Agent, or Firm*—Oblon, Spivak, McClelland, Maier & Neustadt, P.C.

(57) ABSTRACT

A constant velocity universal joint includes an inner race having an outer peripheral face on which inner grooves are formed, an outer race having an inner peripheral face on which outer grooves are formed, a plurality of balls each engaging with each pair of inner groove and outer groove, and an annular cage disposed between the inner race and the outer race and including window portions for retaining respective balls. A coefficient of sliding friction between the ball and a rolling face on the inner groove with which the ball is in contact, and a coefficient of sliding friction between the ball and a rolling face on the outer groove with which the ball is in contact are larger than a coefficient of sliding friction between the ball and a sliding face on the window portion with which the ball is in contact.

16 Claims, 4 Drawing Sheets

CONSTANT VELOCITY UNIVERSAL JOINT

INCORPORATION BY REFERENCE

This application is based on and claims priority under 35 U.S.C. §119 to Japanese Patent Application No. 2005-065524, filed on Mar. 9, 2005, the entire content of which is incorporated herein by reference.

FIELD OF THE INVENTION

This invention generally relates to a constant velocity universal joint.

BACKGROUND

A known constant velocity universal joint includes an inner race whose outer peripheral face is formed with inner grooves, an outer race whose inner peripheral face is formed with outer grooves, a plurality of balls each engaging with each pair of inner groove and outer groove, and an annular cage disposed between the outer peripheral face of the inner race and the inner peripheral face of the outer race. A multiple window portions are formed on the cage so as to penetrate therethrough for retaining the respective balls. Such the constant velocity universal joint is disclosed in Japanese Patent Laid-Open Publication No. 2000-46061. According to the constant velocity universal joint disclosed, when a rotation is input to the inner race, for example, the rotation of the inner race is transmitted to the outer race by means of the balls.

Then, when the rotation is transmitted from the inner race to the outer race, heat is generated since parts constituting the constant velocity universal joint are in contact with one another. In this case, by the decrease of coefficient of friction among the parts of the constant velocity universal joint, heat can be reduced according to the constant velocity universal joint disclosed. The reduction of heat among the parts results in prevention of flaking of the balls, and the like, which then leads to a long operating life of the constant velocity universal joint.

However, since the coefficient of friction among the parts is reduced, the sliding contact is caused between the inner groove with very high plane pressure and the ball, or between the outer groove and the ball. The sliding contact at a portion with very high plane pressure causes high abrasion, which leads to the decrease of the operating life of the constant velocity universal joint. Accordingly, occurrence of the sliding contact between the inner groove with very high plane pressure and the ball, and between the outer groove and the ball should be prevented. Further, the sliding contact should be changed to the rolling contact.

Thus, a need exists for a constant velocity universal joint in which a rolling contact can be obtained between an inner groove and a ball, and/or between an outer groove and a ball.

SUMMARY OF THE INVENTION

According to an aspect of the present invention, a constant velocity universal joint includes an inner race having an outer peripheral face on which inner grooves are formed, an outer race having an inner peripheral face on which outer grooves are formed, a plurality of balls each engaging with each pair of inner grove and outer groove, and an annular cage disposed between the outer peripheral face of the inner race and the inner peripheral face of the outer race and including window portions for retaining respective balls, each window portion being formed so as to penetrate through the cage. A coefficient of sliding friction between the ball and a rolling face on the inner groove of the inner race with which the ball is in contact, and a coefficient of sliding friction between the ball and a rolling face on the outer groove of the outer race with which the ball is in contact are larger than a coefficient of sliding friction between the ball and a sliding face on the window portion with which the ball is in contact.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention is explained with reference to the attached drawings.

Figure 1:
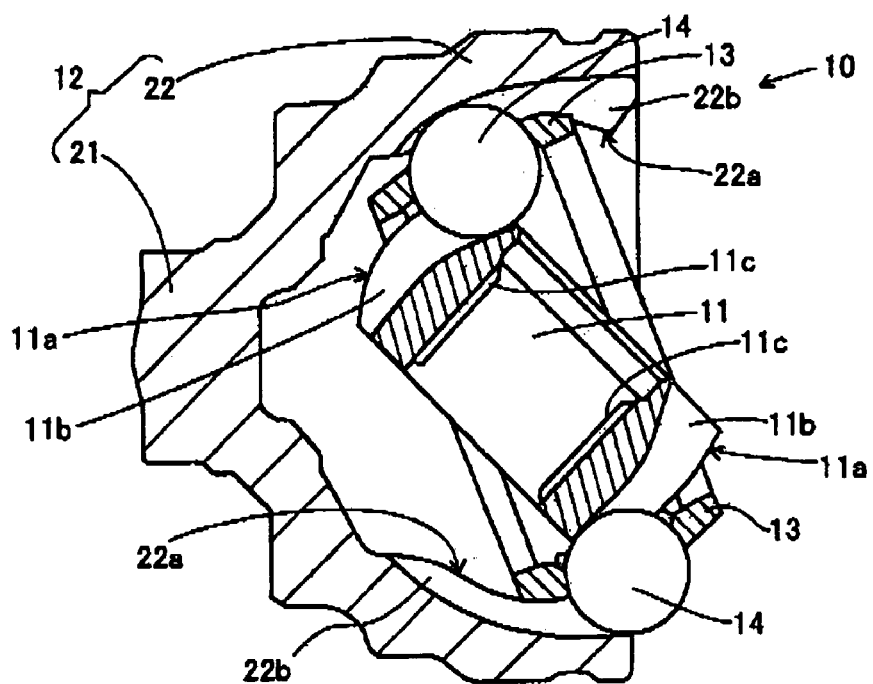
FIG. 1 is an axially sectional view of a constant velocity universal joint according to an embodiment of the present invention.
Figure 2:
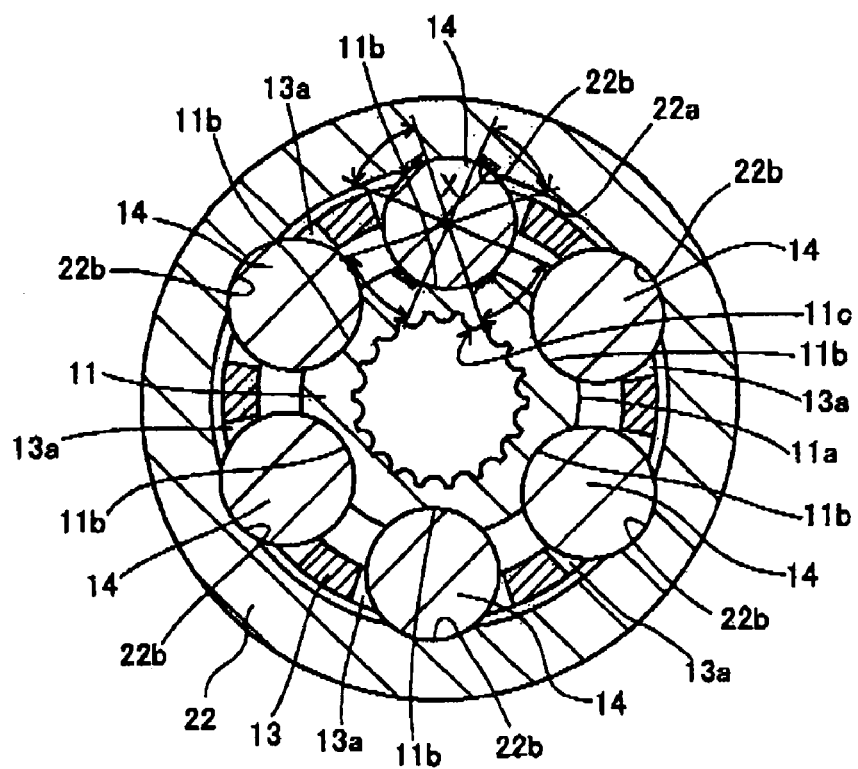
FIG. 2 is a radially sectional view of the constant velocity universal joint according to the embodiment of the present invention.
Figure 3:
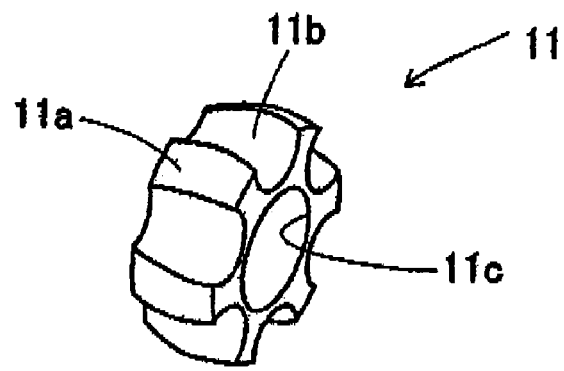
FIG. 3 is a perspective view of an inner race.
Figure 4:
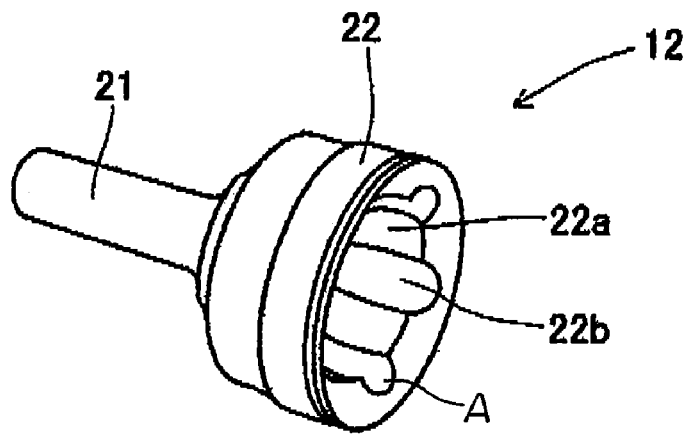
FIG. 4 is a perspective view of an outer race.
Figure 5:
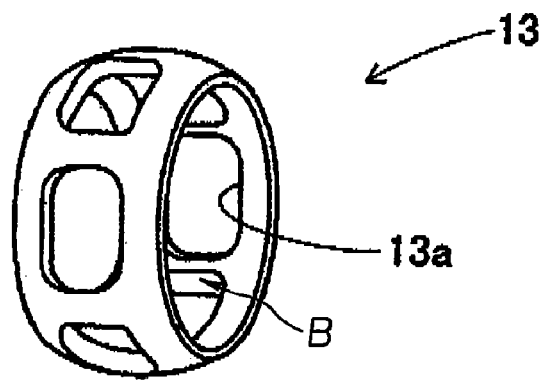
FIG. 5 is a perspective view of a cage.

First, a structure of a constant velocity universal joint 10 according to the embodiment of the present invention is explained with reference to FIGS. 1 to 5. FIG. 1 is an axially sectional view of the constant velocity universal joint 10. In this case, an inner race 11 is provided so as to incline relative to an outer race 12 of the constant velocity universal joint 10 for the purposes of clearly indicating component parts thereof. FIG. 2 is a radially sectional view of the constant velocity universal joint 10. FIG. 3 is a perspective view of the inner race 11. FIG. 4 is a perspective view of the outer race 12. FIG. 5 is a perspective view of a cage 13.

As shown in FIGS. 1 and 2, the constant velocity universal joint 10 is of a ball fixed joint type. The joint 10 includes the inner race, 11, the outer race 12, the cage 13, and balls 14.

The inner race 11 made of JIS SCr420H (chromium steel) has a substantially cylindrical shape as shown in FIGS. 1 to 3. Each outermost peripheral face 11a of the inner race 11 has a uniform arc shape in axially cross section as shown in FIG. 1, and also in radially cross section. That is, the outermost peripheral face 11a of the inner race 11 has a partially spherical shape.

6 recessed, arc-shaped inner grooves 11b are formed on an outer periphery of the inner race 11 at even intervals when viewed in radially cross section in such a manner that each inner groove 11b extends in parallel with an axial direction of the joint 10. Further, an inner peripheral spline 11c is formed on an inner periphery of the inner race 11 so as to extend in parallel with the axial direction of the joint 10. An outer peripheral spline (not shown) formed on an end portion of an intermediate shaft (not shown) is meshed with the inner peripheral spline 11c in a pressing manner.

As shown in FIGS. 1, 2, and 4, the outer race 12 made of JIS S53C (carbon steel) includes a driven shaft 21 and a cylindrical portion 22 having a cylindrical shape with a bottom portion. One end of the driven shaft 21 is integrally formed on an outer side of the cylindrical portion 22. Each innermost peripheral face 22a of the cylindrical portion 22 has a uniform arc shape when viewed in axially cross section as shown in FIG. 1, and also in radially cross section as shown in FIG. 2. That is, the innermost peripheral face 22a of the cylindrical portion 22 has a partially spherical shape. 6 recessed, arc-shaped outer grooves 22b are formed on an inner periphery of the cylindrical portion 22 at even intervals when viewed in radialy cross section in such a manner that each outer groove 22b extends in parallel with the axial direction of the joint 10.

The cage 13 made of JIS SCr420H (chromium steel) has a substantially cylindrical shape as shown in FIGS. 1, 2, and 5. The cage 13 is disposed between the inner race 11 and the outer race 12 with keeping a small gap therebetween. An inner peripheral face of the cage 13 is formed corresponding to a shape of each outermost peripheral face 11a of the inner race 11. Precisely, the inner peripheral face of the cage 13 has a partially spherical face, and a diameter of the inner peripheral face is slightly larger than that of the outermost peripheral face 11a of the inner race 11.

An outer peripheral face of the cage 13 is formed corresponding to a shape of each innermost peripheral face 22a of the cylindrical portion 22 of the outer race 12. Precisely, the outer peripheral face of the cage 13 has a partially spherical shape, and a diameter of the outer peripheral face is slightly smaller than that of the innermost peripheral face 22a of the cylindrical portion 22 of the outer race 12. Accordingly, the cage 13 is relatively rotatable to the inner race 11 and the outer race 12 without contacting therewith.

Further, 6 window portions 13a are formed on the cage 13 at even intervals. Each window portion 13a is of a substantially rectangular shape. Precisely, as shown in FIG. 5, a width in a circumferential direction of the window portion 13a is larger than that in an axial direction thereof. Then, the axial width of the window portion 13a is substantially equal to an external diameter of the ball 14. The window portions 13a of the cage 13 are provided for retaining the respective balls 14.

The ball 14 made of JIS SUJ2 (high carbon chromium bearing steel) is of a spherical shape. As shown in FIGS. 1 and 2, each ball 14 is received, in a rolling manner, in a pair of inner and outer grooves 11b and 22b of the inner race 11 and the cylindrical portion 22 of the outer race 12 respectively. That is, each ball 14 is engageable with each pair of inner and outer grooves 11b and 22b in a circumferential direction. Further, each ball 14 is inserted into and retained by each window portion 13a of the cage 13. Accordingly, the balls 14 transmit a rotation of the inner race 11 to the outer race 12. At this time, the external diameter of the ball 14 is substantially equal to the axial width of the window portion 13a of the cage 13. That is, an outer peripheral face of the ball 14 is made contact with faces of the window portion 13a facing each other in the axial direction, and not made in contact with faces of the window portion 13a facing each other in the circumferential direction.

Then, grease is sealingly filled in a specified area of the joint 10 covered by the cylindrical portion 22 of the outer race 12 and a boot (not shown).

Next, a specified portion of the constant velocity universal joint 10 on which predetermined amorphous hard carbon film is formed is explained below.

First, portions where amorphous hard carbon film is formed are explained. A first amorphous hard carbon film A is formed on each surface of the inner groove 11b of the inner race 11. Precisely, the first amorphous hard carbon film A may be formed on the whole surface of each inner groove 11b, or a predetermined range thereof. The predetermined range indicates, for example, a range from 20 degrees to 60 degrees in cases where an innermost part of the inner groove 11b in radially cross section is defined as 0 degree relative to a center of curvature X of the inner groove 11b (i.e. a range with hatching or a range indicated by two-headed arrow in FIG. 2). In a state in which a rotation is transmitted between the inner race 11 and the outer race 12, the ball 14 is made in contact with the predetermined range of the inner groove 11b. Each contact portion of the inner groove 11b with which the ball 14 is made in contact in a state in which a rotation is transmitted between the inner race 11 and the outer race 12 is hereinafter called a rolling face.

Further, the first amorphous hard carbon film A is also formed on each surface of the outer groove 22b of the cylindrical portion 22 of the outer race 12. Precisely, the first amorphous hard carbon film A may be formed on the whole surface of each outer groove 22b, or a predetermined range thereof. The predetermined range indicates, for example, a range from 20 degrees to 60 degrees in cases where an innermost part of the outer groove 22bin radially cross section is defined as 0 degree relative to a center of curvature X of the outer groove 22b (i.e. a range with hatching or a range indicated by two-headed arrow in FIG. 2). In a state in which a rotation is transmitted between the inner race 11 and the outer race 12, the ball 14 is made in contact with the predetermined range of the outer groove 22b. Each contact portion of the outer groove 22b with which the ball 14 is made in contact in a state in which a rotation is transmitted between the inner race 11 and the outer race 12 is hereinafter also called a rolling face.

Then, a second amorphous hard carbon film B is formed on each surface of the window portion 13a of the cage 13. Precisely, the second amorphous hard carbon film B may be formed on the whole surface of each window portion 13a of the cage 13, or faces axially facing each other. The ball 14 is made in contact with these axially facing faces of the window portion 13a. Each contact portion of the window portion 13a with which the ball 14 is made contact is hereinafter called a sliding face.

Details of the first amorphous hard carbon film A and the second amorphous hard carbon film B are explained below. The first and second amorphous hard carbon films are both made of, for example, diamond-like carbon (DLC). That is, the first and second amorphous hard carbon films may consist of a film made of DLC only, or a laminated film of tungsten carbide and DLC (WC/C). In the case of WC/C, a surface coat of the laminated film is DLC.

The first amorphous hard carbon film A has for example, a surface roughness Ra of 0.32 μm, a hardness of 1,000 Hv, a film thickness of 1.0 μm, and an adhesion strength of 30N or more. Then, a physical vapor deposition (PVD) method at 200 degrees C. or lower is used for deposition of the first amorphous hard carbon film A.

Further, the second amorphous hard carbon film B has for example, a surface roughness Ra of 0.2 μm, a hardness of 2,000 HV, a film thickness of 1.0 μm, and an adhesion strength of 30 N or more. Then, the physical vapor deposition (PVD) method at 200 degrees C. or lower is also used for deposition of the second amorphous hard carbon film.

Figure 6:
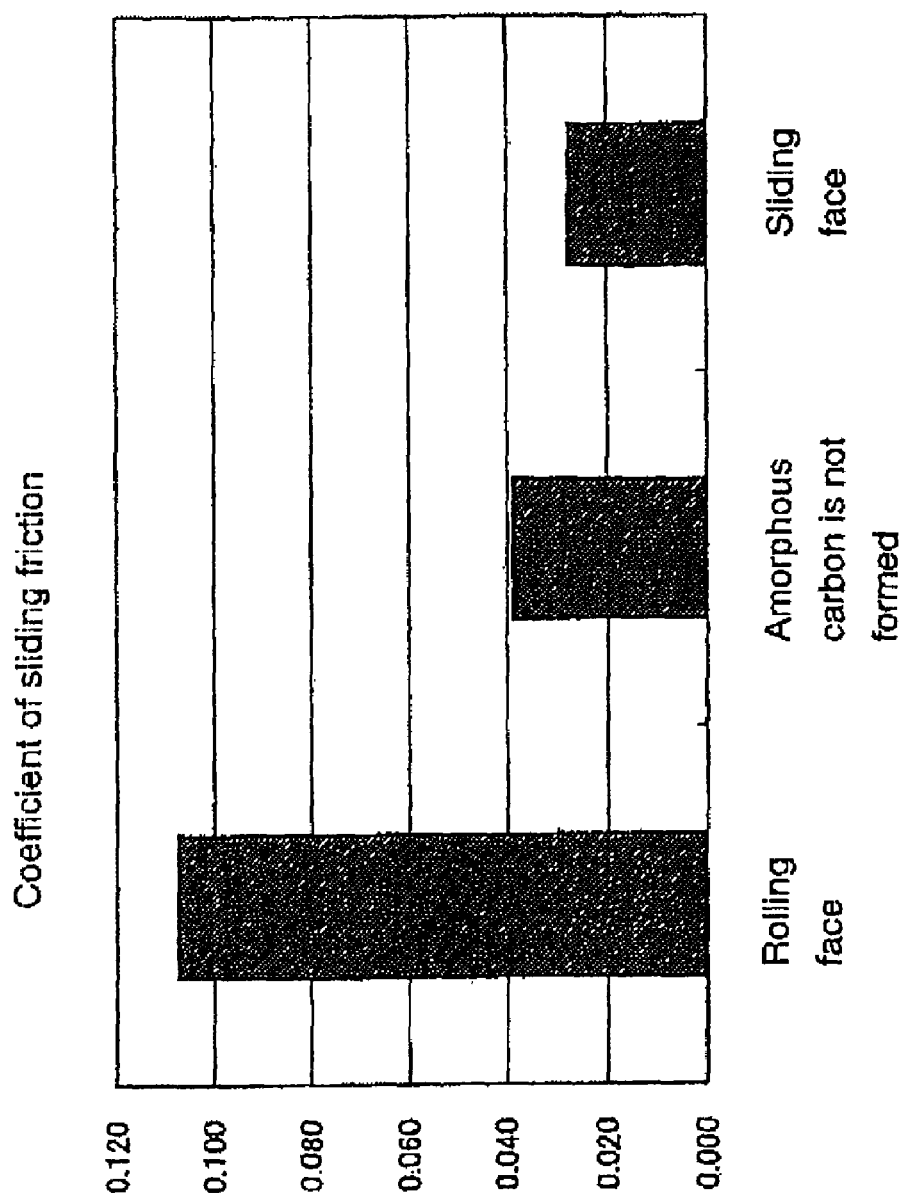
FIG. 6 is a graph showing respective coefficients of sliding friction between a ball and a rolling face on which a first amorphous hard carbon film is formed, and between a ball and a sliding face on which a second amorphous hard carbon film is formed.

Each coefficient of sliding friction between the ball 14 and the aforementioned rolling face or the sliding face is explained with reference to FIG. 6. FIG. 6 is a graph showing the respective coefficients of sliding friction between the ball 14 and the rolling face on which the first amorphous hard carbon film A is formed, and between the ball 14 and the sliding face on which the second amorphous hard carbon film B is formed. Further, FIG. 6 shows the coefficient of sliding friction between the ball 14 and the rolling face or the sliding face on which the amorphous carbon is not formed, for the purposes of comparison.

As shown in FIG. 6, the coefficient of sliding friction between the ball 14 and the rolling face on which the first amorphous hard carbon film A is formed is 0.108. The coefficient of sliding friction between the ball 14 and the sliding face on which the second amorphous hard carbon film B is formed is 0.025. At this time, the coefficient of sliding friction between the ball 14 and the rolling face or the sliding face on which the amorphous carbon is not formed is 0.039.

That is, by the first amorphous hard carbon film A formed on respective surfaces of the inner grooves 11$b$ and the outer grooves 22$b$, the coefficient of sliding friction between the ball 14 and the rolling face is high compared to a case in which the amorphous hard carbon film is not formed (i.e. unprocessed). Further, by the second amorphous hard carbon film B formed on the respective surfaces of the window portions 13$a$ of the cage 13, the coefficient of sliding friction between the ball 14 and the sliding face is low compared to a case in which the amorphous hard carbon film is not formed. As shown in FIG. 6, the coefficient of sliding friction between the ball 14 and the rolling face is larger by 0.083 than that between the ball 14 and the sliding face.

Accordingly, since the coefficient of sliding friction between the ball 14 and the rolling face is larger than that between the ball 14 and the sliding face, the ball 14 is slidable on the sliding face while the ball 14 is not slidable on the rolling face. As a result, the rolling contact instead of sliding contact appears between the rolling face with very high plane pressure and the ball 14. The abrasion of the rolling face may be reduced, thereby increasing an operating life of the constant velocity universal joint 10.

Further, by the adoption of the physical vapor deposition method at 200 degrees C. or lower for the deposition of the first amorphous hard carbon film and the second amorphous hard carbon film, the reduction of strength of base material subjected to the deposition may be prevented.

Figure 7:
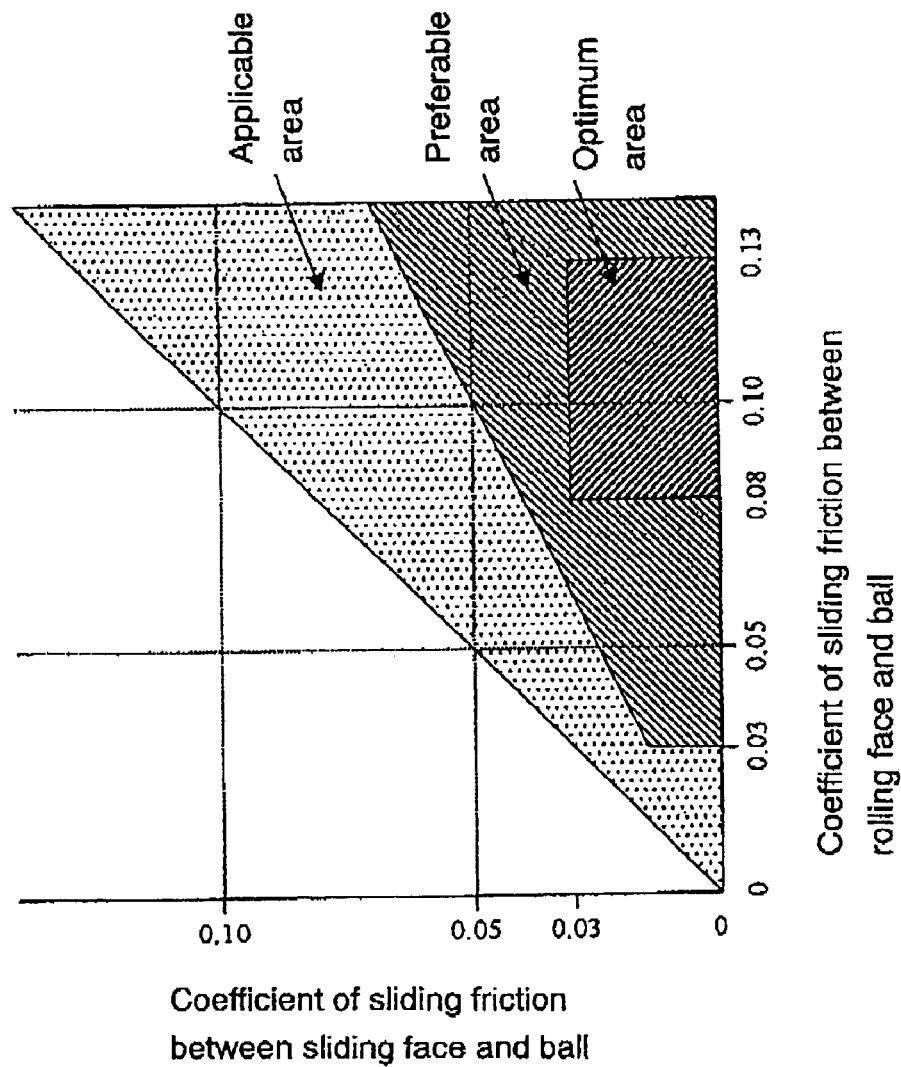
FIG. 7 is a graph showing a relationship of respective coefficients of sliding friction between the ball and the rolling face, and between the ball and the sliding face.

Next, a relationship between the coefficient of sliding friction between the rolling face and the ball 14, and the coefficient of sliding friction between the sliding face and the ball 14 are explained with reference to FIG. 7. An area with dots in FIG. 7 shows a state in which the coefficient of sliding friction between the rolling face and the ball 14 is larger than that between the sliding face and the ball 14. Within this area, the rolling contact is obtained between the rolling face and the ball 14.

Further, a hatched portion in FIG. 7 shows a state in which the coefficient of sliding friction between the rolling face and the ball 14 is two times or more as large as the coefficient of sliding friction between the sliding face and the ball 14, and at the same time the coefficient of sliding friction between the rolling face and the ball 14 is equal to or greater than 0.03. Within this portion, a difference between the respective coefficients of sliding friction between the rolling face and the ball 14 and between the sliding face and the ball 14 is large and thus the rolling contact may be further assured between the rolling face and the ball 14. Further, with 0.03 or more of the coefficient of sliding friction between the rolling face and the ball 14, a slippage may be surely prevented therebetween.

Furthermore, a hatched portion with oblique lines from top left to bottom right in FIG. 7 shows an optimum area for a relationship between the coefficient of sliding friction between the rolling face and the ball 14, and the coefficient of sliding friction between the sliding face and the ball 14 according to the present embodiment. That is, the coefficient of sliding friction between the rolling face and the ball 14 is in a range from 0.08 to 0.13 while the coefficient of sliding friction between the sliding face and the ball 14 is equal to or smaller than 0.03. With 0.08 or more of the coefficient of sliding friction between the rolling face and the ball 14, the rolling contact may be surely assured therebetween. Further, with 0.13 or less of the coefficient of sliding friction, resistance between the rolling face and the ball 14 may be reduced. Meanwhile, with 0.03 or less of the coefficient of sliding friction between the sliding face and the ball 14, resistance between the sliding face and the ball 14 may be surely prevented. Accordingly, a loss occurring in a rotation transmitting force between the rolling face and the ball 14 may be reduced.

According to the aforementioned embodiment, the first amorphous hard carbon film is formed on the rolling face while the second amorphous hard carbon film is formed on the sliding face. In this case, however, as far as the coefficient of sliding friction between the rolling face and the ball 14 is larger than that between the sliding face and the ball 14, the condition is not limited to the above. For example, the first amorphous hard carbon film is formed on the rolling face while nothing is formed on the sliding face. Alternatively, nothing is formed on the rolling face while the second amorphous hard carbon film is formed on the sliding face.

Further, according to the aforementioned embodiment, a surface roughness Ra of the first amorphous hard carbon film formed on the rolling face may be in a range from 0.2 µm to 1.0 µm. Then, the coefficient of sliding friction between the ball 14 and the rolling face may be surely specified in a range from 0.03, or precisely 0.08, to 0.13.

Furthermore, according to the aforementioned embodiment, a hardness of the first amorphous hard carbon film formed on the rolling face may be in a range from 500 Hv to 1,500 Hv. Then, the coefficient of friction between the ball 14 and the rolling face may be surely specified in a range from 0.03, or specifically 0.08, to 0.13.

Furthermore, according to the aforementioned embodiment, a film thickness of the first amorphous hard carbon film formed on the rolling face may be in a range from 0.3 µm to 2.0 µm, or specifically, from 0.5 µm to 1.5 µm. In addition, an adhesion strength of the first amorphous hard carbon film may be equal to or greater than 30 N.

Furthermore, according to the aforementioned embodiment, a surface roughness Ra of the second amorphous hard carbon film formed on the sliding face may be equal to or smaller than 0.2 µm. Then, the coefficient of sliding friction between the ball and the sliding face may be surely specified equal to or smaller than 0.03.

Furthermore, according to the aforementioned embodiment, a hardness of the second amorphous hard carbon film formed on the sliding face may be in a range from 1,500 Hv to 2,500 Hv. Then, the coefficient of friction between the ball 14 and the sliding face may be surely specified equal to or smaller than 0.03.

Furthermore, according to the aforementioned embodiment, a film thickness of the second amorphous hard carbon film formed on the sliding face is specified in a range from 0.3 to 2.0 µm, or more precisely, from 0.5 to 1.5 µm. In addition, an adhesion strength of the second amorphous hard carbon film may be 30 N or more.

Furthermore, according to the aforementioned embodiment, the amorphous hard carbon film is deposited by the physical vapor deposition (PVD) method at equal to or lower than 200 degrees C. The PVD includes sputtering, vacuum metalizing, ion plating, or the like. In cases where the amorphous hard carbon film is deposited at relatively high temperature such as 500 degrees C., strength of the inner race 11 and/or the outer race 12 may be decreased. However, the deposition of the amorphous hard carbon film conducted at relatively low temperature such as 200 degrees C. may prevent decrease of the strength of the inner race 11 and/or the outer race 12.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A constant velocity universal joint comprising:
   an inner race having an outer peripheral face on which inner grooves are formed;
   an outer race having an inner peripheral face on which outer grooves are formed;
   a plurality of balls, each engaging with a pair of an inner groove and outer groove;
   an annular cage disposed between the outer peripheral face of the inner race and the inner peripheral face of the outer race and including window portions for retaining respective balls, each window portion being formed so as to penetrate through the cage;
   wherein a coefficient of sliding friction between each of said balls and a rolling face on the inner groove of the inner race with which the ball is in contact, and a coefficient of sliding friction between the respective ball and a rolling face on the outer groove of the outer race with which the ball is in contact are larger than a coefficient of sliding friction between the respective ball and a sliding face on the window portion with which the ball is in contact,
   wherein an amorphous hard carbon film is formed on the rolling face on the inner or outer grooves, and another amorphous hard carbon film is formed on the sliding face.

2. A constant velocity universal joint according to claim 1, wherein the coefficient of sliding friction between the ball and the rolling face on the inner or outer grooves is equal to or greater than 0.03.

3. A constant velocity universal joint according to claim 1, wherein the amorphous hard carbon film formed on the rolling face on the inner or outer grooves has a surface roughness Ra of 0.2 μm to 1.0 μ.

4. A constant velocity universal joint according to claim 3, wherein the amorphous hard carbon film formed on the rolling face on the inner or outer grooves has a hardness of 500Hv to 1,500 Hv.

5. A constant velocity universal joint according to claim 4, wherein the amorphous hard carbon film formed on the rolling face on the inner or outer grooves is deposited by a physical vapor deposition method at equal to or lower than 200 degrees C.

6. A constant velocity universal joint according to claim 5, wherein the rolling face on the inner or outer grooves in radially cross section is specified in a range from 20to 60degrees and an inner most portion of the inner groove or the outer groove is defined as 0degree relative to a center of curvature of the inner groove or the outer groove.

7. A constant velocity universal joint according to claim 6, wherein a coefficient of sliding friction between the ball and the sliding face is equal to or smaller than 0.03.

8. A constant velocity universal joint according to claim 1, wherein the amorphous hard carbon film formed on the rolling face on the inner or outer grooves has a hardness of 500Hv to 1,500 Hv.

9. A constant velocity universal joint according to claim 1, wherein the amorphous hard carbon film formed on the rolling face on the inner or outer grooves is deposited by a physical vapor deposition method at equal to or lower than 200degrees C.

10. A constant velocity universal joint according to claim 1, wherein the rolling face on the inner or outer grooves in radially cross section is specified in a range from 20 to 60 degrees and an inner most portion of the inner groove or the outer groove is defined as 0 degree relative to a center of curvature of the inner groove or the outer groove.

11. A constant velocity universal joint according to claim 10, wherein a coefficient of sliding friction between the ball and the sliding face is equal to or smaller than 0.03.

12. A constant velocity universal joint according to claim 1, wherein the amorphous carbon film formed on the sliding face has a surface roughness Ra of equal to or smaller than 0.2 μ.

13. A constant velocity universal joint according to claim 12, wherein the amorphous hard carbon film formed on the sliding face has a hardness of 1,500 Hv to 2,500 Hv.

14. A constant velocity universal joint according to claim 1, wherein the another amorphous carbon film formed on the sliding face is deposited by a physical vapor deposition method at equal to or lower than 200 degrees C.

15. A constant velocity universal joint according to claim 1, wherein a coefficient of sliding friction between each of said balls and a sliding face on the window portion having the another amorphous hard carbon film thereon is smaller than a coefficient of sliding friction between the respective ball and the window portion not having the amorphous hard carbon film thereon.

16. A constant velocity universal joint comprising:
   an inner race having an outer peripheral face on which inner grooves are formed, wherein an amorphous hard carbon film is formed on the inner grooves;
   an outer race having an inner peripheral face on which outer grooves are formed, wherein an amorphous hard carbon film is formed on the outer grooves;
   a plurality of balls each engaging with a pair of an inner groove and outer groove;
   an annular cage disposed between the outer peripheral face of the inner race and the inner peripheral face of the outer race and including window portions for retaining respective balls, each window portion being formed so as to penetrate through the cage, wherein another amorphous hard carbon film is formed on the window portion, the another amorphous hard carbon film formed on the window portion having a least one characteristic which is different from the amorphous hard carbon film formed on the inner or outer grooves,
   wherein a coefficient of sliding friction between each of said balls and a rolling face on the inner groove of the inner race having an amorphous hard carbon film thereon, and a coefficient of sliding friction between the respective ball and a rolling face on the outer groove of the outer race having an amorphous hard carbon film thereon are larger than a coefficient of sliding friction between the respective ball and the rolling face of the inner or outer grooves not having the amorphous hard carbon film thereon, and wherein a coefficient of sliding friction between each of said balls and a sliding face on the window portion having the another amorphous hard carbon film thereon is smaller than a coefficient of sliding friction between the respective ball and the window portion not having the amorphous hard carbon film thereon, and is also smaller than the coefficient of sliding friction between the respective ball and the rolling face on the inner or outer grooves having an amorphous hard carbon film thereon.

* * * * *